(12) United States Patent
Nakai et al.

(10) Patent No.: US 6,530,300 B2
(45) Date of Patent: Mar. 11, 2003

(54) MACHINE TOOL

(75) Inventors: Masateru Nakai, Yamatokoriyama (JP); Toshihide Kamei, Yamatokoriyama (JP); Haruki Yoshida, Yamatokoriyama (JP); Masahiro Oguma, Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 0 days.

(21) Appl. No.: 09/865,500

(22) Filed: May 29, 2001

(65) Prior Publication Data

US 2001/0047701 A1 Dec. 6, 2001

(30) Foreign Application Priority Data

Jun. 2, 2000  (JP) .......................... 2000-165941

(51) Int. Cl.[7] .............. B23B 3/00; B23B 7/00
(52) U.S. Cl. ......................... 82/117; 82/149
(58) Field of Search ................. 82/117, 149, 901, 82/173, 124; 409/135, 136, 137

(56) References Cited

U.S. PATENT DOCUMENTS

| | | | |
|---|---|---|---|
| 4,539,876 A | * | 9/1985 | Myers et al. ............... 408/234 |
| 4,821,612 A | * | 4/1989 | Myers ......................... 29/563 |
| 4,955,770 A | * | 9/1990 | Kitamura ..................... 384/16 |
| 5,318,396 A | * | 6/1994 | Babel et al. ................. 409/137 |
| 5,704,262 A | * | 1/1998 | Baumbush et al. ........... 82/124 |
| 5,947,663 A | * | 9/1999 | Egawa et al. ........ 29/DIG. 101 |
| 6,120,222 A | * | 9/2000 | Hiramoto et al. ........... 409/134 |

FOREIGN PATENT DOCUMENTS

JP          10-328968          12/1998

* cited by examiner

*Primary Examiner*—Kien T. Nguyen
(74) *Attorney, Agent, or Firm*—Armstrong, Westerman & Hattori, LLP

(57) ABSTRACT

The present invention provides a machine tool which is adapted to discharge chips brought into the work area from the machining area outside the machine tool by a simpler operation. The machine tool (1) comprises a bed (51), a column (52), a spindle head (53), a table (54), a pallet base (63) and a pallet changer (11), wherein the spindle head (53) and the table (54) are movable relative to each other along three orthogonal axes. In the machine tool (1), a chip conveyor (10) having a transport path located below a machining area (A) and a work area (B) is provided for conveying chips. Thus, chips generated in the machining area (A) and chips brought into the work area (B) from the machining area (A) are collected on the chip conveyor (10), and conveyed and discharged outside the machine tool (1) by the chip conveyor (10).

2 Claims, 4 Drawing Sheets

MACHINE TOOL

BACKGROUND OF THE INVENTION

1. Field of the Invention

The present invention relates to a machine tool which has a chip conveyor for collecting chips generated during machining of a workpiece and discharging the chips outside the machine tool.

2. Description of Related Art

One exemplary machine tool of the aforesaid type is shown in FIG. 4, which is a side view partly cutaway. The machine tool 50 illustrated in FIG. 4 is a so-called horizontal machining center. The machine tool 50 includes: a bed 51; a column 52 provided on the bed 51; a spindle head 53 supported by the column 52; a table 54 provided in a machining area A on the bed 51 for receiving a pallet 55 placed thereon with a workpiece (not shown) mounted on the pallet 55; a pallet base 63 provided outside the machining area A in a work area B located on the left side of the bed 51 as seen in FIG. 4; a pallet changer 60 for replacing the pallet 55 placed on the table 54 with a pallet 55 placed on the pallet base 63; and a chip conveyor 70 having a transport path provided below the machining area A as extending along a Z-axis. The column 52 is movable along an X-axis (extending perpendicularly to the paper face of FIG. 4), and the spindle head 53 is movable along a Y-axis. The table 54 is movable along the Z-axis. The pallet base 63 and the pallet changer 60 are disposed on a supporting base 64 provided on the left side of the bed 51 as seen in FIG. 4.

The pallet changer 60 includes a pivot arm 61 having pallet retainers 61a provided on opposite ends thereof, and pivot/lift means 62 for horizontally pivoting and vertically moving the pivot arm 61. The pivot arm 61 is moved up to retain the pallets 55 on the pallet retainers 61a at the opposite ends thereof, then pivoted by 180 degrees, and moved down. Thus, the pallets 55 respectively placed in the work area B and in the machining area A are replaced with each other.

The chip conveyor 70 is a so-called scraper conveyor, which includes an endless chain, a plurality of plates 72 coupled to the chain, a plurality of scrapers 73 coupled to the chain in a properly spaced relation, and sprockets 71 around which the chain is stretched. The machine tool 50 has a center trough structure in which the chip conveyor 70 is disposed along a widthwise center line of the bed 51 (with respect to the X-axis).

In the machine tool 50 having the aforesaid construction, a pallet 55 mounted with a workpiece is placed and fixed on the table 54 in the machining area A, and then the spindle head 53, the column 52 and the table 54 are each properly driven for machining the workpiece. Chips generated during the machining are collected on the chip conveyor 70 provided centrally of the bed 51, and conveyed and discharged outside the machine tool 50 by the chip conveyor 70.

The machining operation is thus performed and, upon completion of the machining operation, the pallet changer 60 replaces the pallet 55 placed on the table 54 in the machining area A with the pallet 55 placed on the pallet base 63 in the work area B. A predetermined workpiece to be next machined is mounted on the pallet 55 placed on the pallet base 63 during the current machining operation.

The machine tool 50 is usually adapted to supply a coolant to the vicinity of a machining part during the machining operation. Therefore, the chips generated during the machining are mostly washed away by the coolant thereby to be collected together with the coolant on the chip conveyor 70, but partly left adhering to the workpiece and the pallet 55 and brought into the work area B by the pallet replacement. An operator removes the chips from the workpiece and the pallet 55 when dismounting the workpiece from the pallet 55 on the pallet base 63 and mounting the next workpiece on the pallet 55. The chips are temporarily accumulated in an oil pan, then regularly removed from the oil pan, and discarded in a chip box disposed in a predetermined position.

However, it is a troublesome operation to manually discard the chips brought into the work area B outside the machine tool 50. Due to operator's negligence in performing the troublesome operation, the chips may be less frequently removed from the oil pan, resulting in long-term accumulation of the chips in the oil pan. This is environmentally unfavorable, and may cause malfunction of surrounding drive mechanisms.

In view of the foregoing, it is an object of the present invention to provide a machine tool which is adapted to discharge chips brought into the work area from the machining area outside the machine tool by a simpler operation.

SUMMARY OF THE INVENTION

In accordance with the present invention to solve the aforesaid drawback, there is provided a machine tool, which comprises a bed, a column provided on the bed, a spindle head supported by the column, a table provided in a machining area for receiving a pallet placed thereon with a workpiece mounted on the pallet, a pallet base provided in a work area located outside the machining area, a pallet changer for replacing the pallet placed in the machining area with a pallet placed in the work area, the spindle head and the table being movable relative to each other along three orthogonal axes, and a chip conveyor having a transport path located below the machining area and the work area for conveying chips, whereby chips generated in the machining area and chips brought into the work area from the machining area are collected on the chip conveyor, and conveyed and discharged outside the machine tool by the chip conveyor.

In the machine tool according to the present invention, the transport path of the chip conveyor is located below the machining area and the work area. Therefore, where chips adhering to the workpiece and the pallet spontaneously fall when the pallet is transported from the machining area into the work area by the pallet changer or when the workpiece is dismounted from the pallet, the chips are collected on the chip conveyor, and conveyed and discharged outside the machine tool by the chip conveyor.

In other words, an operator can clean the workpiece and the pallet simply by brushing down the chips from the workpiece and the pallet onto the chip conveyor when dismounting the workpiece. Therefore, the long-term chip accumulation can be prevented which may otherwise occur when the chips are less frequently removed due to operator's negligence in performing the conventional troublesome chip removing operation. Thus, the environmentally unfavorable problems and the adverse effects on the surrounding drive mechanisms can be prevented which may otherwise occur due to the accumulation of the chips.

The machine tool preferably further comprises an oil pan provided below the pallet base for receiving a coolant and chips falling out of the pallet placed on the pallet base, the oil pan having a discharge port communicating with the transport path of the chip conveyor.

With this arrangement, the coolant and the chips falling from the workpiece and the pallet are received in the oil pan, so that the operator does not have to be careful for prevention of scattering of the coolant and the chips around the pallet base during the cleaning operation. Thus, the cleaning operation can be performed very easily. The coolant and the chips received in the oil pan can be discarded outside the machine tool simply by discharging the coolant and the chips from the discharge port onto the chip conveyor. Thus, the environmentally unfavorable problems can be prevented which may otherwise occur due to the long-term accumulation of the chips in the oil pan in the conventional case.

DESCRIPTION OF THE PREFERRED EMBODIMENT

Figure 1:
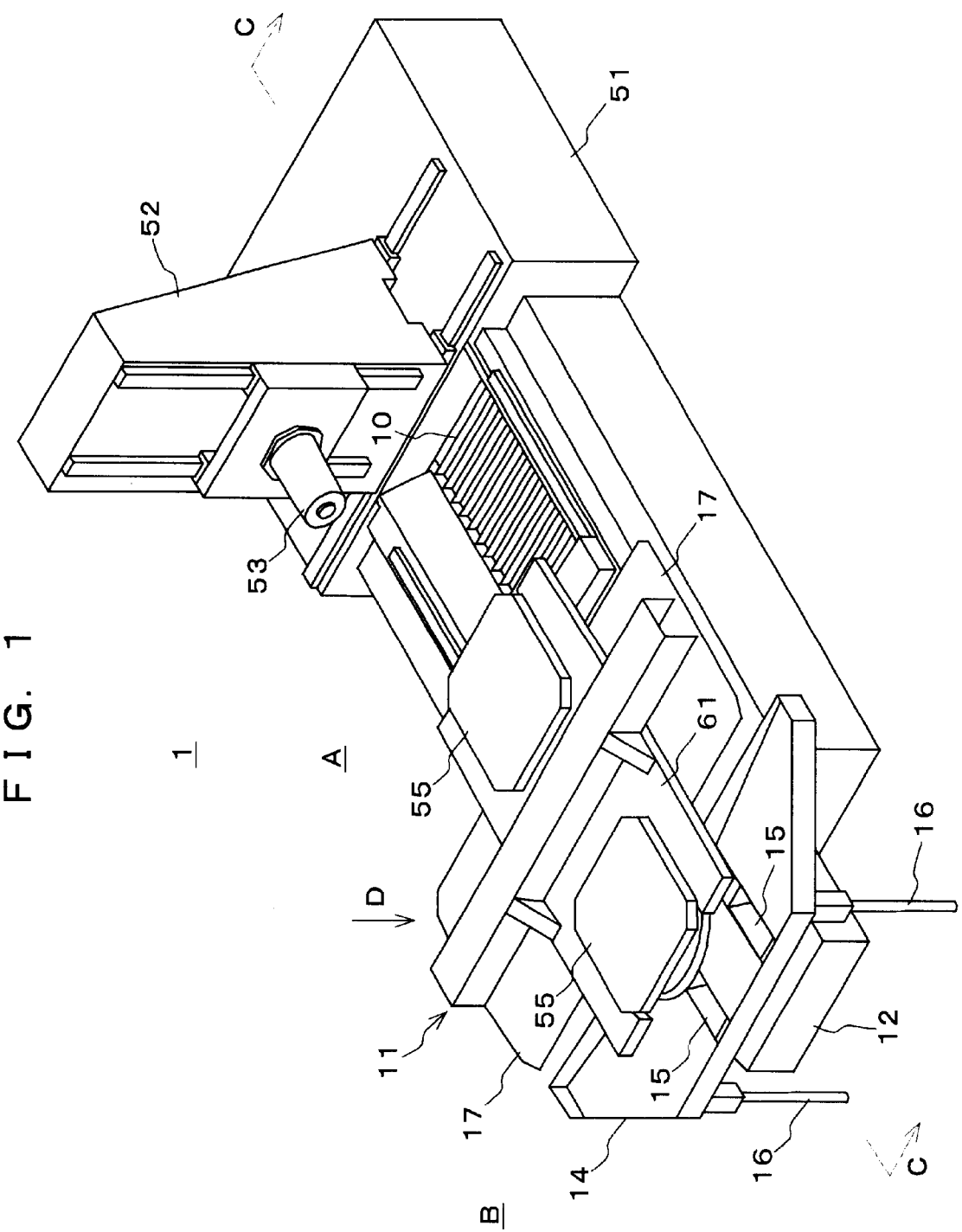
FIG. 1 is a perspective view illustrating a machine tool according to an embodiment of the present invention.
Figure 2:
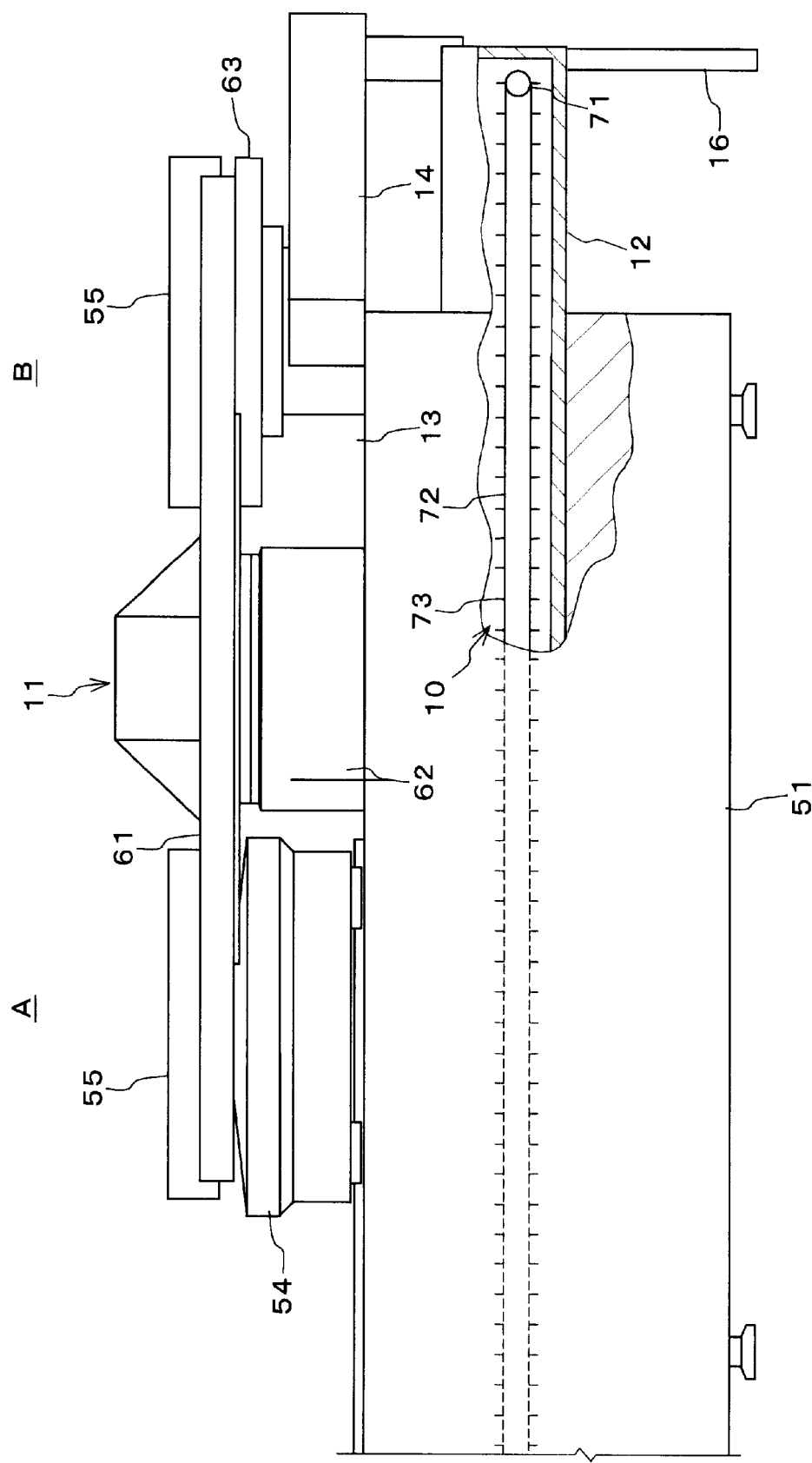
FIG. 2 is a sectional view as seen in the direction of arrows C in FIG. 1.
Figure 3:
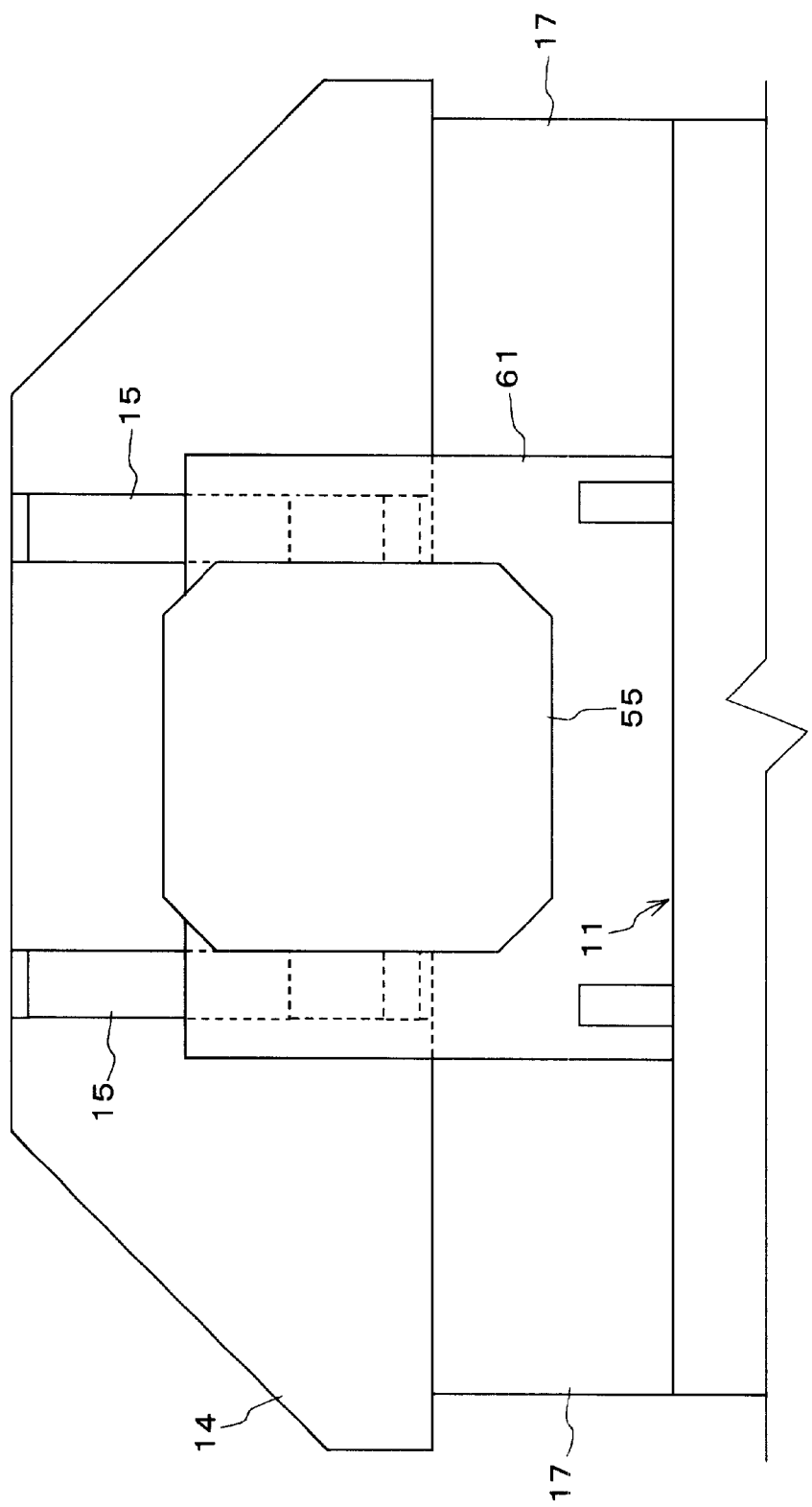
FIG. 3 is a plan view as seen in the direction of an arrow D in FIG. 1.
Figure 4:
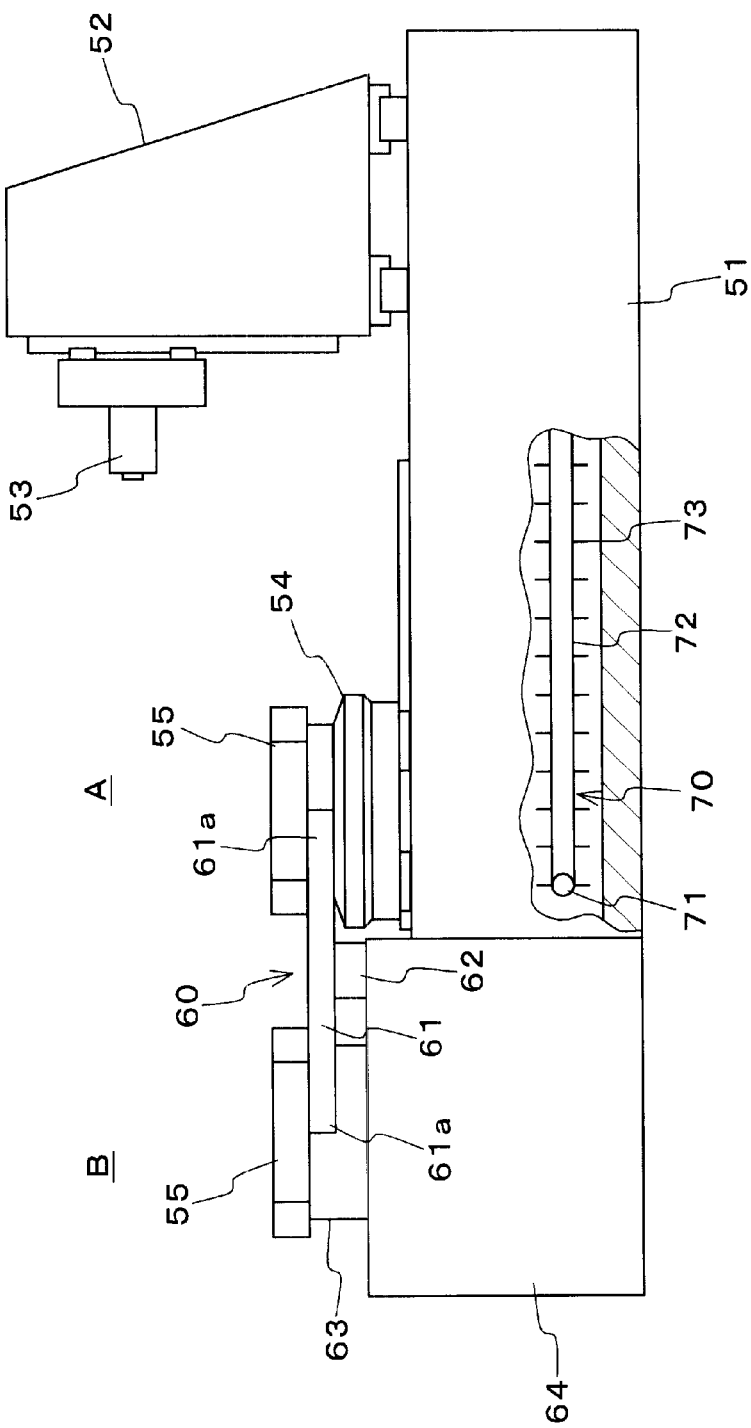
FIG. 4 is a partly cutaway side view illustrating a conventional machine tool.

With reference to the attached drawings, the present invention will hereinafter be described by way of a specific embodiment. FIG. 1 is a perspective view illustrating a machine tool according to this embodiment. FIG. 2 is a sectional view as seen in the direction of arrows C in FIG. 1, and FIG. 3 is a plan view as seen in the direction of an arrow D in FIG. 1. As shown in FIGS. 1 to 3, the machine tool 1 according to this embodiment is a modification of the conventional machine tool 50 described above, and is different from the machine tool 50 in that the chip conveyor 10 and the pallet changer 11 respectively have different constructions from the chip conveyor 70 and the pallet changer 60 of the conventional machine tool 50. Therefore, components equivalent to those of the conventional machine tool 50 are denoted by like reference characters, and a detailed explanation will not be given thereto.

As shown in FIG. 2, the chip conveyor 10 has a transport path located below a machining area A and a work area B. In FIG. 2, a reference numeral 12 denotes a trough in which components of the chip conveyor 10 such as a chain, plates 72, scrapers 73 and sprockets 71 are accommodated.

As shown in FIGS. 1 to 3, an oil pan 14 is provided at an end of a bed 51. Chips falling out of a pallet 55 placed on a pallet base 63 are received in the oil pan 14. The oil pan 14 has discharge ports 15 communicating with the transport path of the chip conveyor 10, so that the chips received in the oil pan 14 are discharged from the discharge ports 15 onto the chip conveyor 10. In FIGS. 1 to 3, a reference numeral 16 denotes legs supporting the oil pan 14, and a reference numeral 17 denotes a cover member.

In the machine tool 1 of this embodiment having the aforesaid construction, the transport path of the chip conveyor 10 is located below the machining area A. Therefore, chips generated in the machining area A are directly received on the chip conveyor 10 and discharged outside the machine tool 1 by the chip conveyor 10. The transport path of the chip conveyor 10 is also located below the work area B. Therefore, when the workpiece is dismounted, chips adhering to the pallet 55 in the machining area A and introduced into the work area B by the pallet changer 11 are brushed down into the oil pan 14, then discharged from the discharge ports 15 onto the chip conveyor 10, and conveyed and discharged outside the machine tool 1 by the chip conveyor 10.

With the machine tool 1 according to this embodiment, an operator can clean the workpiece and the pallet 55 simply by brushing down the chips from the workpiece and the pallet 55 into the oil pan 14 when dismounting the workpiece, and discharging the chips from the discharge ports 15 onto the chip conveyor 10. Therefore, the long-term chip accumulation can be prevented which may otherwise occur when the chips are less frequently removed due to operator's negligence in performing the conventional troublesome chip removing operation. Thus, the environmentally unfavorable problems and the adverse effects on the surrounding drive mechanisms can be prevented which may otherwise occur due to the accumulation of the chips.

Since the chips are brushed down into the oil pan 14, the operator does not have to be careful for prevention of scattering of the coolant and the chips around the pallet base during the cleaning operation. Thus, the cleaning operation can be performed very easily.

While one embodiment of the present invention has thus been described, the invention is not limited to this specific embodiment. For example, the machine tool 1 described above has a center trough structure in which the chip conveyor 10 is provided along the widthwise center line of the bed 51, but the structure of the machine tool 1 is not limited thereto. As long as the transport path of the chip conveyor 10 is located below the machining area A and the work area B, the chip conveyor 10 may be located along a side edge of the bed 51 parallel to the widthwise center line.

Although the scraper conveyor is employed as the chip conveyor 10 in the embodiment described above, the chip conveyor 10 is not limited thereto. A spiral conveyor may be employed which is adapted to transport and discharge the chips by rotatively driving a spiral.

Although the pallet changer 11 is adapted to change the pallet 55 by pivoting the pivot arm 61 in the embodiment described above, the pallet changer 11 is not limited thereto. A pallet changer of a so-called shuttle type may be employed which is adapted to guide a pallet 55 along a guide rail provided in the work area B.

The machine tool 1 described above is constructed such that the chips are received in the oil pan 14. However, the oil pan 14 may be obviated, as long as the chips can assuredly be introduced onto the chip conveyor 10. However, it is preferred to provide the oil pan 14, because the chips and the coolant can extensively be received in the oil pan 14.

What is claimed is:

1. A machine tool comprising a bed, a column provided on the bed, a spindle head supported by the column, a table provided in a machining area, for receiving a pallet placed thereon, with a workpiece mounted on a pallet, a pallet base provided in a work area located outside the machining area, a pallet changer for replacing the pallet placed in the machining area with a pallet placed in the work area, the spindle head and the table being movable relative to each other along three orthogonal axes, and a chip conveyor having a transport path located below the machining area and the work area for conveying chips, whereby chips generated in the machining area and chips brought into the work area from the machining area are collected on the chip conveyor, and conveyed and discharged outside the machine tool by the chip conveyor.

2. A machine tool as set forth in claim 1, further comprising an oil pan provided below the pallet base for receiving a coolant and chips falling out of the pallet placed on the pallet base, the oil pan having a discharge port communicating with the transport path of the chip conveyor.

* * * * *